(12) United States Patent
Nizou et al.

(10) Patent No.: US 9,887,432 B2
(45) Date of Patent: Feb. 6, 2018

(54) BATTERY OF LITHIUM-ION TYPE WITH A CATHODE OF VARYING POROSITY, AND A CORRESPONDING METHOD

(71) Applicant: COMMISSARIAT A L'ENERGIE ATOMIQUE ET AUX ENERGIES ALTERNATIVES, Paris (FR)

(72) Inventors: Sylvain Nizou, Noizay (FR); Nicolas Lopez, Montferrat (FR); Jouhaiz Rouchou, Saint Egreve (FR); Christophe Secouard, L'isle-adam (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 400 days.

(21) Appl. No.: 14/410,237

(22) PCT Filed: Jun. 25, 2013

(86) PCT No.: PCT/IB2013/055198
§ 371 (c)(1),
(2) Date: Dec. 22, 2014

(87) PCT Pub. No.: WO2014/002002
PCT Pub. Date: Jan. 3, 2014

(65) Prior Publication Data
US 2015/0325877 A1    Nov. 12, 2015

(30) Foreign Application Priority Data

Jun. 29, 2012 (FR) ..................... 12 01850

(51) Int. Cl.
*H01M 10/0562* (2010.01)
*H01M 10/04* (2006.01)
(Continued)

(52) U.S. Cl.
CPC ..... *H01M 10/0562* (2013.01); *H01M 4/0404* (2013.01); *H01M 4/0423* (2013.01);
(Continued)

(58) Field of Classification Search
CPC ........... H01M 4/0423; H01M 10/0562; H01M 2004/021
(Continued)

(56) References Cited

U.S. PATENT DOCUMENTS

2006/0024579 A1    2/2006  Kolosnitsyn et al.
2009/0011217 A1*   1/2009  Ottermann ............. C23C 14/10
                                                        428/310.5
(Continued)

*Primary Examiner* — Basia A Ridley
*Assistant Examiner* — James M Erwin
(74) *Attorney, Agent, or Firm* — Clark & Brody

(57) ABSTRACT

A thin layer lithium-ion type battery comprising, on a substrate (20, 30), a cathode current collector layer (22, 36) and an active portion constituted by a stack of a cathode layer (23, 35) made of material suitable for inserting lithium ions, an electrolyte layer (24, 34), and an anode layer (25, 33), wherein the cathode layer presents, across its thickness, porosity that varies between its interface with the cathode current collector layer and its interface with the electrolyte layer, the variation in the porosity being non-zero so as to improve cohesion at both interfaces.

10 Claims, 4 Drawing Sheets

(51) Int. Cl.
*H01M 4/134* (2010.01)
*H01M 4/38* (2006.01)
*H01M 4/1395* (2010.01)
*H01M 4/04* (2006.01)
*H01M 4/13* (2010.01)
*H01M 4/139* (2010.01)
*H01M 10/0525* (2010.01)
*H01M 10/0585* (2010.01)
*H01M 6/40* (2006.01)
*H01M 4/02* (2006.01)

(52) U.S. Cl.
CPC ............ *H01M 4/13* (2013.01); *H01M 4/134* (2013.01); *H01M 4/139* (2013.01); *H01M 4/1395* (2013.01); *H01M 4/38* (2013.01); *H01M 6/40* (2013.01); *H01M 10/0436* (2013.01); *H01M 10/0525* (2013.01); *H01M 10/0585* (2013.01); *H01M 2004/021* (2013.01); *H01M 2004/028* (2013.01); *H01M 2300/0068* (2013.01)

(58) Field of Classification Search
USPC ........................................................ 429/162
See application file for complete search history.

(56) References Cited

U.S. PATENT DOCUMENTS

| | | |
|---|---|---|
| 2011/0070489 A1 | 3/2011 | Chiang et al. |
| 2011/0076567 A1 | 3/2011 | Bouillon |
| 2011/0168550 A1 | 7/2011 | Wang et al. |

* cited by examiner

PRIOR ART

BATTERY OF LITHIUM-ION TYPE WITH A CATHODE OF VARYING POROSITY, AND A CORRESPONDING METHOD

The present invention relates to the technical field of batteries of lithium-ion type made of thin-layer technology.

Such batteries are conventionally made up of a plurality of layers comprising an active portion, protective layers, current collector layers, and barrier films. They are generally referred to as "micro-batteries", insofar as the active portion presents a thickness of less than 20 micrometers (µm).

The active portion of the battery comprises a stack of a cathode layer, an electrolyte layer, and an anode layer.

This active portion may be obtained by various methods, including physical vapor deposition (PVD) techniques, such as evaporation or cathode sputtering.

The operation of the battery is as follows: while it is charging, lithium ions move from the cathode towards the anode, whereas while it is discharging, lithium ions move from the anode towards the cathode.

The materials of the cathode, electrolyte, and anode layers are selected as a function of the voltage that it is desired to obtain at the terminals of the battery, and as a function of the intended application.

Reference is made to FIG. 1, which is a diagram showing an example of a conventional lithium-ion battery. FIG. 1 shows a single battery on a substrate. Naturally, a plurality of batteries are conventionally made on a common substrate. The batteries are then cut apart, e.g. for putting into packages.

Thus, the battery is made on a substrate 10, e.g. of silicon, which has deposited thereon an insulating layer 11 that serves as a barrier against diffusion of lithium. The layer 11 may be made of silicon nitride, for example. Furthermore, between the substrate 10 and the battery layer 11, it is possible to provide a layer of silicon oxide. This layer facilitates bonding of the silicon nitride on the silicon substrate.

A cathode current collector layer 12 is formed on the layer 11. This layer 12 is made of metal, e.g. of titanium, of aluminum, or of copper.

The substrate 10 may also be constituted by a metal foil, itself electrically conductive and performing simultaneously the function of the substrate 10 and the function of the current collector 12. A foil is a metal sheet having a thickness of about ten micrometers.

A cathode layer 13 is formed on the layer 12.

This layer 13 is made of a material adapted for lithium ion insertion.

It may in particular be lithium cobalt oxide ($LiCoO_2$) or indeed lithium titanium oxisulfide (LiTiOS).

With LiTiOS, the thickness of the layer 13 lies in the range a few hundreds of nanometers to 10 µm.

Thus, by way of example, a TiOS layer may be formed on the surface of the cathode current collector layer 12, a thin film of lithium then being deposited on the TiOS layer by a physical vapor deposition method. Thereafter, lithium diffuses naturally into the TiOS layer which becomes transformed into a layer of LiTiOS.

Another method is described in Document EP-2 320 502 in which lithium ion insertion is obtained from lithium deposited on the anode layer. It is the presence of a short circuit between the anode and cathode layers that enables lithium to migrate and Li+ ions to penetrate into the cathode layer. The anode and cathode layers are separated once lithium migration has terminated.

A layer of electrolyte 14 is deposited on the cathode layer 13.

The material used may be a solid electrolyte, e.g. lithium phosphorous oxinitride (LiPON). The use of a solid electrolyte presents numerous advantages, such as the possibility of using metallic lithium for making the anode layer and for enabling the battery to operate at high temperatures.

The thickness of this layer 14 lies in the range a few hundreds of nanometers to several micrometers.

An anode layer 15 is then formed on the electrolyte layer 14.

This layer 15 may be constituted in particular by silicon, germanium, or lithium.

Silicon and germanium are materials having the particular feature of presenting electron conductivity that increases under the influence of the lithium ions that pass through them while the battery is in operation. Lithium ions become alloyed in transient manner with silicon or germanium.

This anode layer 15 may present thickness lying in the range a few tens of nanometers to 10 µm.

The active portion of the battery is constituted by the stack of layers 13 to 15.

An anode current collector layer 16 is then deposited on the layer 15.

This layer 16 may be made of metal, such as titanium, aluminum, or copper.

Finally, contact pads 17 and 18 are formed on the layers 12 and 16.

The stack of layers 11 to 16 may be encapsulated using materials or assemblies of materials that serve to prevent contact between the stack and water, or indeed oxygen.

These materials are not shown in FIG. 1.

In conventional manner, the materials that constitute the active portion of the battery are deposited so as to present characteristics that are substantially uniform throughout their volume or their thickness.

This applies in particular to their chemical composition.

In this respect, reference may be made to the article "Characterization of all-solid-state Li/LiPONB/TiOS microbatteries produced at the pilot scale" by B. Fleutot et al., Journal of Power Sources 196 (2011), pp. 10289-10296. That article mentions in particular that the chemical composition of the TiOS layer presents a composition that is uniform throughout the thickness of the samples. This is established by spectroscopic analyses.

Furthermore, those materials present morphological isotropy.

This means that the porosity, or indeed the density of the materials is substantially the same throughout the thicknesses of the layer in question.

Finally, each of those materials presents mechanical, thermal, and electrical characteristics that are specific thereto.

During stages of battery charging and discharging, strong mechanical stresses are generated between the materials of the active portion of the battery because of the migration of Li+ ions, and also at their interfaces with the cathode current collector and with the anode current collector.

Insofar as the materials of the battery present differing mechanical characteristics, they may become degraded or even separated from one another, under the effect of repeated cycles of the battery.

Such deterioration of the battery can lead to it completely failing to operate after a few cycles.

It should also be observed that the morphology of the materials may likewise have an influence on the performance of the battery.

The performance of the battery is measured not only in terms of its cyclability, i.e. the number of charging and discharging cycles that can be performed by the battery. It is also important for the battery to present large capacity.

By way of example, if consideration is given to a cathode made of TiOS associated with lithium ions, the morphology of the TiOS layer formed before adding lithium ions has an effect on its electrochemical properties.

Thus, a TiOS layer presenting given density can accept a larger quantity of lithium ions than a TiOS layer of smaller density. A battery thus sees its capacity increase when the cathode is made using a denser layer of TiOS.

Furthermore, a TiOS layer of given density may present better cyclability than a TiOS layer of greater density, given that an increase in density is synchronous with an increase in mechanical stress in the TiOS layer. Thus, a battery sees its cyclability increase when the cathode is made from a layer of TiOS that is more porous since it is then more capable of accommodating the mechanical stresses induced by the battery cycling.

Solutions presently in use are thus the result of a compromise between capacity and cyclability, and they are not satisfactory.

An object of the invention is to mitigate those drawbacks by proposing a battery that presents both high capacity and excellent cyclability.

To do this, the solution retained by the inventors is to make the cathode layer of the battery in such a manner that it does not present the same morphology or indeed the same porosity at its interface with the cathode current collector and at its interface with the electrolyte layer.

Thus, this solution differs from those conventionally used, which are based on the active layers of the battery being morphologically isotropic.

The invention thus provides a thin layer lithium-ion type battery comprising, on a substrate, a cathode current collector layer and an active portion constituted by a stack of a cathode layer made of material suitable for inserting lithium ions, an electrolyte layer, and an anode layer, wherein the cathode layer presents, across its thickness, porosity that varies between its interface with the cathode current collector layer and its interface with the electrolyte layer, the porosity at the interface with the electrolyte layer being different from the porosity at the interface with the cathode current collector layer.

This non-zero variation in porosity within the cathode layer makes it possible to improve cohesion at both interfaces, while simultaneously improving both the capacity and the cyclability of the battery.

It makes it possible to adjust the porosity of the cathode layer in such a manner as to increase its mechanical affinity with the materials situated at its interfaces. It also makes it possible to increase the density of the material constituting the cathode layer, in some of its regions, without compromising the robustness of the interfaces with the materials constituting the active layer. This increase in density contributes to increasing the capacity of the battery.

The porosity of the cathode layer lies in the range 0 to 70%, and preferably in the range 0 to 50%.

In a first embodiment, the variation in the porosity is discontinuous.

In another embodiment, the variation in the porosity is continuous.

In a particular embodiment of the battery, the cathode current collector layer is made of titanium, the cathode layer is made of TiOS associated with lithium ions, and the electrolyte layer is made of LiPON.

Under such circumstances, the porosity of the cathode layer is greater at the interface between the cathode layer and the cathode current collector layer than at the interface between the cathode layer and the electrolyte layer.

The invention also provides a method of making a thin layer lithium-ion type battery comprising, on a substrate, a cathode current collector layer and an active portion constituted by a stack of a cathode layer made of material suitable for inserting lithium ions, an electrolyte layer, and an anode layer, wherein the cathode layer is obtained by depositing a material on the cathode current collector layer or on the electrolyte layer, at least one parameter of the deposition technique used being modified between the beginning at the end of deposition operations so that the cathode layer presents, across its thickness, porosity that varies between its interface with the cathode current collector layer and its interface with the electrolyte layer, the variation in the porosity being non-zero.

When using physical vapor deposition, said at least one parameter is selected from the temperature of the substrate and the deposition rate.

In a first implementation, at least one parameter is modified at least once during the deposition operations.

In another implementation of the method, at least one parameter is modified continuously during the deposition operations.

The invention can be better understood and other objects, advantages, and characteristics thereof appear more clearly on reading the following description, which is made with reference to the accompanying drawings, in which.

In general manner, the inventors have set out to understand the phenomena that occur at the interfaces between the materials constituting the active portion of the battery, i.e. the materials constituting the cathode layer, the electrolyte layer, and the anode layer, and also the phenomena that occur at the interfaces between these materials and the materials constituting the anode and cathode current collectors.

The inventors have investigated more particularly the interfaces between the cathode current collector, cathode, and electrolyte layers and the following constituent materials: titanium for the cathode current collector layer; TiOS for the cathode layer; and LiPON for the electrolyte layer.

Cathode layers have thus been made based on TiOS presenting porosities, or indeed densities, that differ depending on the ways in which they are fabricated.

In general, porosity is measured firstly by taking an image of a slice through the stack as observed by an optical microscope, and secondly by processing the image.

This image processing by contrast thresholding or by color thresholding makes it possible to determine accurately the void fraction of the material as a function of the zone under observation.

This image processing, also referred to as segmentation or determining phase fractions or volume fractions, enables porosity measurements to be made at different points of the thickness of the layer.

The processing is performed by software generally supplied by the manufacturers of optical microscopes (e.g. under the names Analysis or Spip).

Stacks were made comprising in succession: a silicon substrate; a 100 nanometer (nm) layer of $SiO_2$; a 100 nm layer of silicon nitride constituting a lithium barrier layer; a 250 nm cathode current collector layer made of titanium; a 1 μm cathode layer made of TiOS deposited by cathode sputtering; a lithium layer deposited by evaporation; and a 1.4 μm thick layer of electrolyte made of LiPON deposited by cathode sputtering. Those stacks therefore did not include an anode layer or an anode current collector layer.

In both stacks, the TiOS layer thus received lithium directly prior to depositing the LiPON layer. The lithium diffused into the TiOS layer and the anode layer was thus constituted by LiTiOS.

Figure 2:
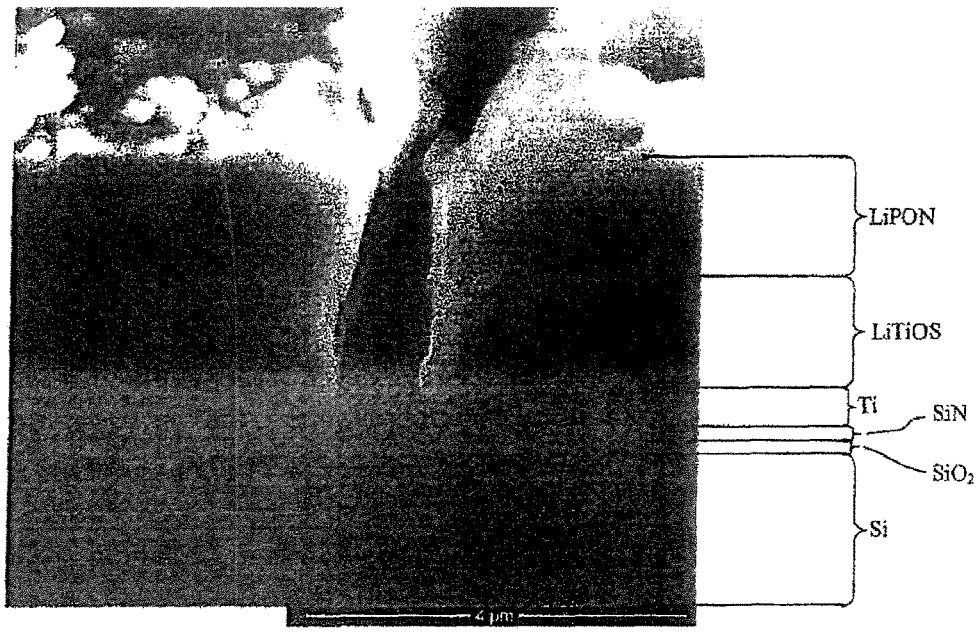
FIGS. 2 and 3 are photographs of stacks showing the observations of the inventors.
Figure 3:
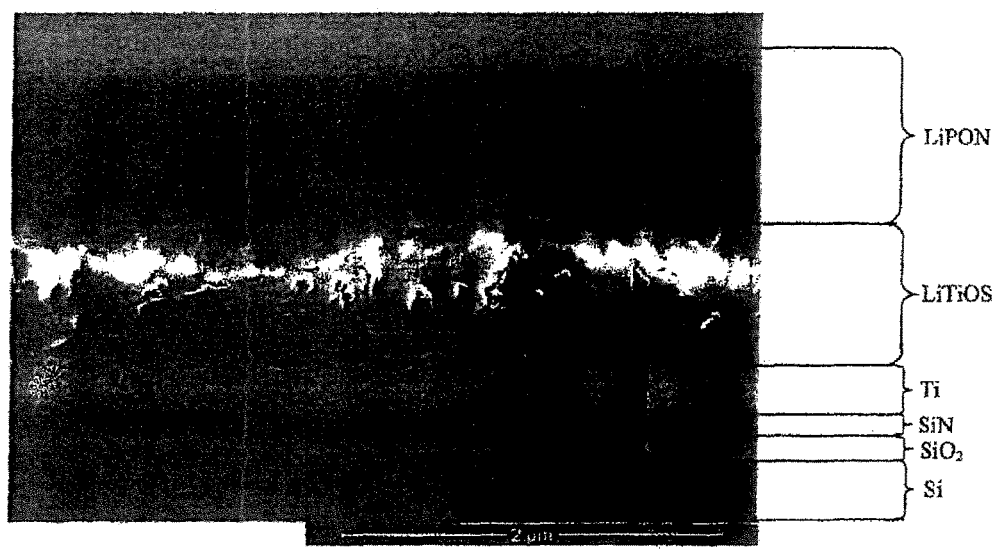

Thus, FIGS. 2 and 3 are section views showing two stacks of this type that were sectioned using a focused ion beam (FIB) ablation method that were photographed using electron microscopy.

The scales corresponding to these two figures are different and they are marked directly on the figures.

In the stack shown in FIG. 2, the LiTiOS of the cathode layer presents greater density than in the corresponding layer of the stack shown in FIG. 3.

The TiOS layer was deposited by a physical vapor deposition method at a temperature of 100° C. for the stack of FIG. 2 and at a temperature of 150° C. for the stack of FIG. 3.

That deposition of TiOS was performed by magnetron cathode sputtering of a titanium target with a plasma of argon, sulfur hydroxide, and oxygen, and the only parameter that was modified between the two stacks was the temperature of the substrate. That technique of cathode sputtering in a reactive atmosphere is described in particular in the document "Pulvérisation cathodique magnétron" [Magnetron cathode sputtering] by A. Billard and F. Perry, published in les Techniques de l'Ingénieur.

Thus, the pressure lay in the range 1 millitorr (mTorr) to 5 mTorr, and for example was equal to 3 mTorr.

The argon flow rate lay in the range 20 standard cubic centimeters per minute (sccm) to 50 sccm, and for example was equal to 30 sccm, the flow rate of oxygen lay in the range 0.1 sccm to 3 sccm, and for example was equal to 0.8 sccm, and the flow rate of $H_2S$ lay in the range 30 sccm to 70 sccm, and for example was equal to 50 sccm.

The backside argon flow rate was 20 sccm, and the backside pressure was 8 Torr.

The power lay in the range 2 watts per square centimeter ($W/cm^2$) to 3 $W/cm^2$, and for example was equal to 2.8 $W/cm^2$, and the deposition rate was 30 nanometers per minute (nm/min).

The porosity of the LiTiOS layer was 0% in the stack of FIG. 2 and 10% in the stack of FIG. 3.

Thus, only the conditions under which the LiTiOS layer was obtained differ between the two stacks. The thicknesses of the various layers are the same in both stacks.

FIG. 2 shows that the LiTiOS layer adheres very poorly to the underlying titanium layer. FIG. 2 shows that the LiTiOS layer separates from the titanium layer and, furthermore, that cracks appear in the LiTiOS layer.

In contrast, FIG. 2 shows good adhesion between the LiTiOS layer and the LiPON layer. This cohesion between the LiTiOS and LiPON layers exists even in the proximity of cracks in these two layers.

FIG. 3 shows that the LiTiOS layer adheres well to the titanium layer. Cohesion can be observed at the interface between these two layers.

However, examining the interface between the LiPON electrolyte layer and the LiTiOS layer shows poor cohesion at the interface between these two layers. Since the mechanical characteristics of these two materials are different, the adhesion of LiTiOS on LiPON is of poor quality, both mechanically speaking and in terms of ion exchanges.

Thus, the work of the inventors has shown that a cathode layer made of LiTiOS presenting given porosity adheres better to an anode current collector layer made of titanium and less well to an electrolyte layer made of LiPON than does a LiTiOS layer that presents lower porosity. The LiTiOS lower porosity layer adheres less well to a titanium anode current collector layer and better to a LiPON electrolyte layer.

It should also be observed that these observations are identical when the TiOS layer has been lithiated after depositing the LiPON electrolyte layer.

These observations thus reveal the difficulties in obtaining good adhesion between the cathode layer and the cathode current collector layer on one side and the electrolyte layer on the other side when the porosity of the cathode layer is uniform throughout its thickness.

Thus, selecting porosity that presents a medium value throughout the thickness of the cathode layer makes it possible to obtain adequate adhesion at the interfaces between the cathode layer and firstly the anode current collector layer and secondly the electrolyte layer.

This uniform mean value results from a compromise that is selected so as to make batteries that are functional, and that present cyclability that is satisfactory.

Nevertheless, such a uniform mean value does not enable adhesion to be optimized at the interfaces and therefore does not enable the cyclability of the battery to be optimized.

It should also be recalled that the porosity of a TiOS cathode layer has effects on its electrochemical properties.

Thus, a denser TiOS layer can accept a larger quantity of lithium ions than a more porous TiOS layer. A battery comprising a denser TiOS layer thus presents greater capacity. However, the denser TiOS layer presents poorer adhesion with a cathode current collector layer made of titanium than does a more porous TiOS layer. The corresponding battery thus presents poorer cyclability.

On the basis of those observations, the solution proposed by the invention is to make a cathode layer out of porous material with porosity that varies across its thickness between its interface with the cathode current collector layer and its interface with the electrolyte layer. In particular, the material may be TiOS.

Thus, the porosity of the cathode layer at the interface with the electrolyte layer presents a value that is strictly different from (less than) the value of the porosity at the interface with the cathode current collector layer. The variation in porosity is thus not zero. It may be estimated that it is at least 5%.

Figure 4A:
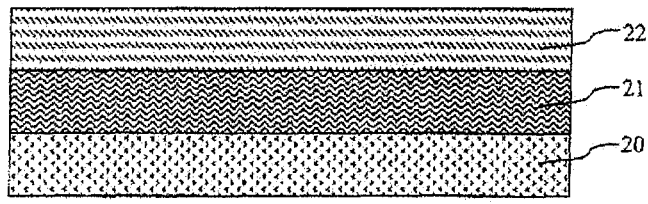
FIGS. 4a to 4c are section views showing diagrammatically the steps of a method of fabricating a lithium-ion battery in accordance with the invention.
Figure 4B:
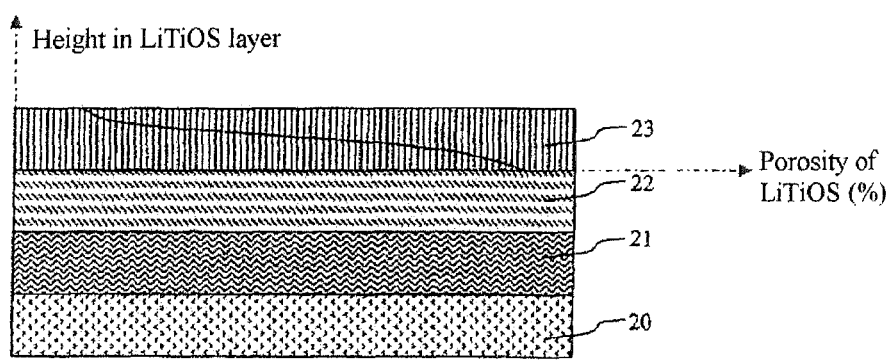

Reference is now made to FIGS. 4a and 4b which show the first step of a method enabling a battery of the invention to be obtained. These figures show only part of the battery that is being fabricated, and they show its various component layers.

Thus, with reference to FIG. 4a, the battery is to be made on a substrate 20, e.g. made of silicon, having an insulating layer 21 formed on its surface, e.g. made of silicon nitride. This layer may in particular be deposited by a technique of the plasma enhanced chemical vapor deposition (PECVD)

type, or by a technique of the low pressure chemical vapor deposition (LPCVD) type. In the examples shown in FIGS. 2 and 3, this insulating layer is formed by a stack of a layer of $SiO_2$ in contact with the silicon substrate, and a layer of silicon nitride in contact with the $SiO_2$ layer.

A layer 22 is formed on this barrier or insulating layer 21, the layer 22 being a cathode current collector layer. This layer 22 is made in particular out of titanium. This is as in the two examples shown in FIGS. 2 and 3.

The steps described with reference to FIG. 4a are performed in conventional manner. Reference may be made in particular to the method and implementation conditions described with reference to FIGS. 2 and 3.

FIG. 4b shows another step of the method, which step is specific to the invention. In this step of the method, a layer 23 corresponding to a cathode layer is deposited. In the example shown in FIGS. 2 and 3, the cathode layer is made of TiOS.

The TiOS layer may be obtained using various methods such as a physical vapor deposition (PVD) technique. In particular, it may be deposited by a technique involving pulsed laser deposition (PLD) or chemical vapor deposition (CVD). Examples of this technique are LPCVD, PECVD, or indeed a CVD technique making use of organic compounds with a metal atom as a precursor known as metal organic chemical vapor deposition (MOCVD).

In a PVD method, certain implementation parameters of the method enable the porosity or the density of the TiOS layer to be adjusted.

These parameters comprise in particular the temperature of the substrate on which the battery is being made and the TiOS deposition rate.

By way of example, the rate at which TiOS is deposited on the substrate may lie in the range 1 angstrom per second (Å/s) to 20 Å/s. Furthermore, the temperature of the substrate may vary over the range ambient temperature at 300° C.

It should be observed that the deposition rate in a PVD chamber can be modified by adjusting the pressure in the PVD chamber and/or by modifying the power of the plasma source.

Still in the context of a PVD technique, it may be emphasized that it is easier to modify deposition rate than temperature. Deposition rate can be modified quickly and under good control. This does not always apply to temperature, given the considerable inertia of the substrate carrier or of the deposition chamber.

These two operating parameters are typical of a PVD technique. Other parameters could also be used in other deposition methods. Thus, for a pulsed laser deposition method (PLD), the power of the laser source or the laser pulse frequency are parameters that are capable of modifying the porosity of the TiOS layer.

In general, a reduction in the temperature of the substrate during deposition leads to denser TiOS being deposited.

Furthermore, a reduction in the deposition rate also leads to denser TiOS being deposited.

An implementation of the PVD method in the context of the invention is described below.

The implementation conditions of the method are the same as those described for the stacks in FIGS. 2 and 3, except concerning temperature.

The temperature of the substrate was modified continuously throughout the duration of deposition, from a value of 150° C. to a temperature of 100° C.

Another method for obtaining this morphology could consist in varying the deposition rate by adjusting the source power from 2000 watts (W) at the beginning of the method to 1000 W at the end of the method.

In the context of this example, the thickness of the resulting TiOS layer was 1 µm.

The analyses that have been performed show that the porosity of the TiOS layer varies continuously from its interface with the titanium layer to its free surface. This is shown with reference to FIG. 5.

FIG. 4b shows in diagrammatic manner how porosity varies with height in the TiOS layer. The porosity of the TiOS layer lies in the range 0 to 70%, and preferably in the range 0 to 50%.

Figure 4C:
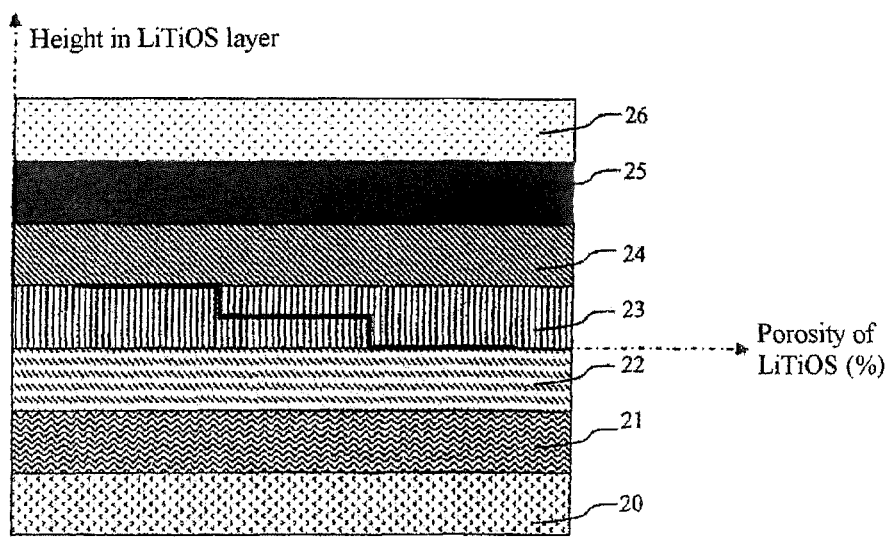

As shown in FIG. 4c, once the TiOS layer 23 had been made, a layer of lithium (not shown) was deposited on the layer 23. After the lithium has diffused, the layer 23 is made of LiTiOS. An electrolyte layer 24 of LiPON is deposited on the LiTiOS layer 23.

Thereafter, an anode layer 25 was deposited on the layer 24 followed by an anode current collector layer 26.

These layers are made in conventional manner. Reference may be made in particular to the method and implementation conditions described with reference to FIGS. 2 and 3. Furthermore, the anode layer 25 may be made of silicon and the anode current collector layer 26 may be made of titanium.

It should be observed that the invention can be implemented using materials other than LiPON for making the electrolyte layer and materials other than titanium for making the cathode current collector layer.

In this context, the materials used for making the electrolyte layer may equally well be solid or liquid (e.g. $LiPF_6$).

Thus, a solid electrolyte may in particular be made of LiPON, LiSiCON, LiSON, or NaSiCON.

Nevertheless, the invention also makes it possible to implement electrolytes in intermediate states, such as ionogels which are part way between solid and gel. Ionogels form part of the family of electrolytes like other polymer electrolytes, UV electrolytes, or solid electrolytes, such as LiPON.

Providing they are capable of taking on a solid state in the battery and providing they are sufficiently fine, all of these electrolytes can be used for making micro-batteries.

Figure 5:
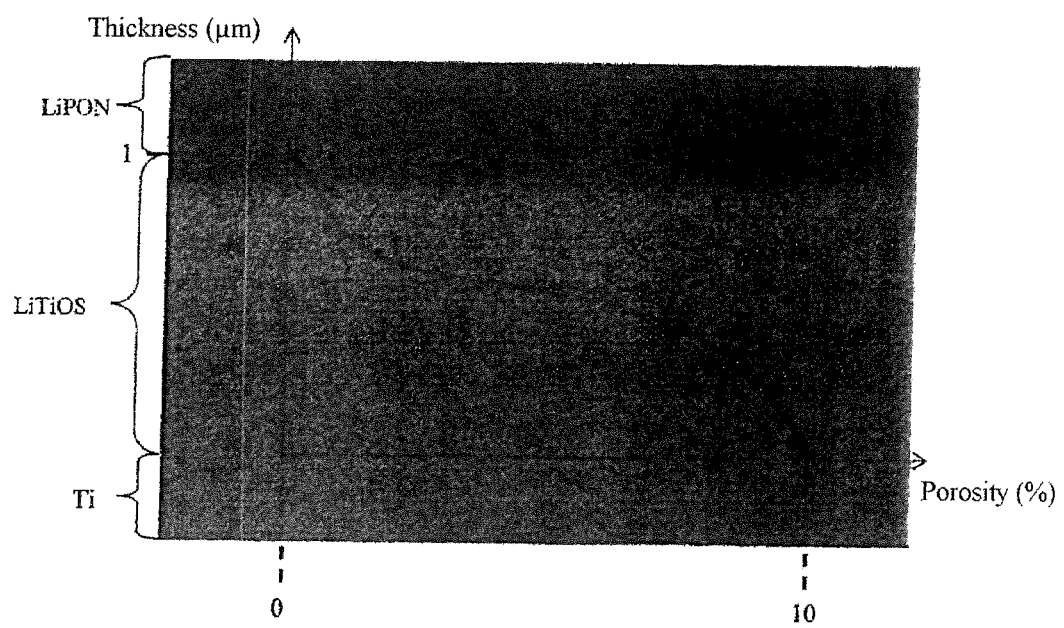
FIG. 5 is a photograph of a stack made in accordance with the method of the invention.

Reference is made to FIG. 5 which is a fragmentary section view showing a stack obtained by the above-described method.

Examining the interface between the LiTiOS layer and firstly the titanium layer and secondly the LiPON layer shows very good adhesion in both situations between the two layers in question.

Furthermore, FIG. 5 also plots a curve revealing how porosity varies as a function of the thickness of the LiTiOS layer.

By way of example, on comparing FIG. 5 with FIG. 2, it can be seen that the increase in the porosity across the thickness of the LiTiOS layer make it possible to obtain good adhesion of the LiTiOS layer on the Ti layer.

Thus, with the type of porosity profile shown in FIG. 4b or in FIG. 5, the resulting battery optimizes adhesion of the TiOS layer both on the titanium layer and on the LiPON layer. This enhances the performance of the battery in terms of cyclability.

Furthermore, given these adhesion constraints at the interfaces, the mean density of the TiOS layer is optimized. This also makes it possible to optimize the capacity of the battery.

This is particularly true with the example shown in FIG. 5, in which the density of the LiTiOS increases quickly across the thickness of the layer.

The method of the invention thus makes it possible to optimize both cyclability and capacity, while avoiding the compromises conventionally required in prior art batteries.

The above-described implementation of the method of the invention provides for continuous variation in one of the parameters, specifically the temperature of the substrate or deposition rate throughout the duration of deposition.

The method of the invention is not limited to such an implementation. Thus, one of the parameters of the method could be modified stepwise during deposition operations.

In other words, as shown by way of example in FIG. 4c, the porosity in the layer 23 could vary in steps, so as to form a staircase-like curve.

In FIG. 4c, three different levels are shown. The invention is not limited to this implementation. What is required is that at least one of the implementation parameters of the method is modified at least once, so as to obtain a porosity curve presenting at least two levels.

It is also possible to provide a multiplicity of levels. Under such circumstances, it is difficult to identify steps within the layer 23 and it can be considered that the variation in the porosity is substantially continuous.

In preferred manner, at least one of the parameters of the method is modified at least twice during deposition operations. This appears to be useful for avoiding mechanical and indeed electrochemical problems at the interface between two layers of TiOS that present different densities.

Naturally, when porosity varies substantially continuously, such a risk is eliminated.

Furthermore, it is not necessarily the same parameter that is modified throughout deposition operations.

Figure 1:
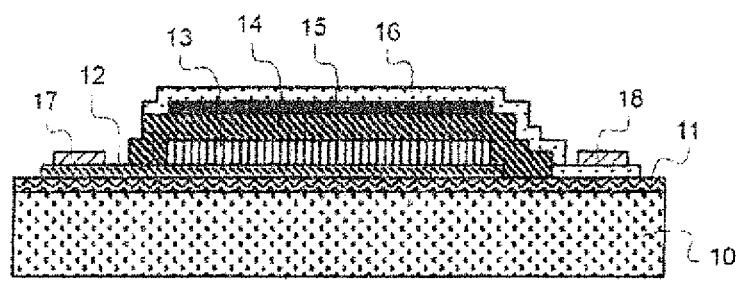
FIG. 1 is a diagram of a conventional lithium-ion battery.
Figure 6:
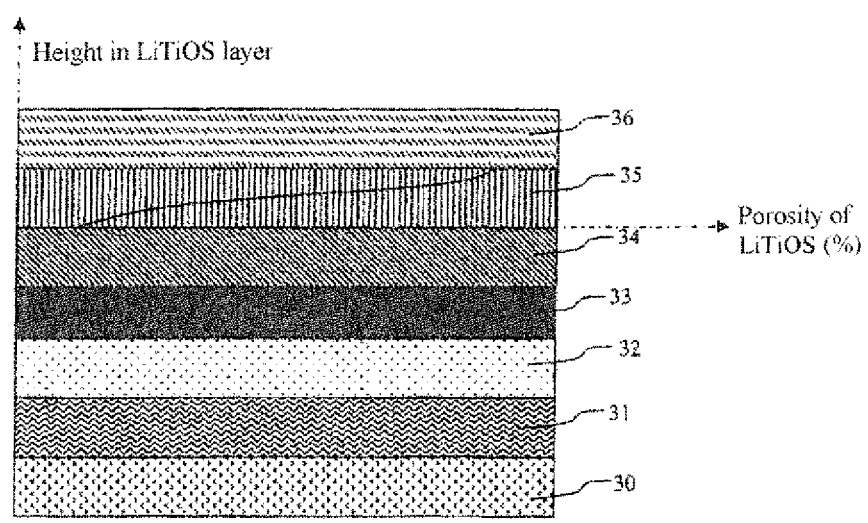
FIG. 6 is a diagram showing a variant implementation of the method shown in FIGS. 4a to 4c.

Reference is made below to FIG. 6 which shows a variant battery of the invention.

The battery is made on a substrate 30, e.g. made of silicon, with an insulating layer 31 formed on its surface, e.g. a layer of silicon nitride.

A layer 32 is formed on the barrier layer 31, which layer 32 is an anode current collector layer. This layer 32 is made in particular out of titanium.

An anode layer 33 is formed on the layer 32, e.g. a layer made of silicon, and an electrolyte layer 34 is formed on the layer 33, in particular a layer of LiPON.

Once more, the method of the invention is implemented so as to cause the porosity of the cathode layer 35 that is subsequently deposited on the layer 34 to vary.

As mentioned above, this layer 35 may be made in particular out of TiOS.

Thus, while this layer is being deposited, one of the parameters of the method used is modified stepwise or continuously.

If a PVD technique is used, it is possible for example to decide to vary the temperature of the substrate 30 or indeed to vary the deposition rate.

As mentioned above, the deposition rate and the substrate temperature vary in the same direction as porosity.

By way of example, the substrate temperature may be modified continuously throughout the duration of deposition from a temperature of 100° C. to a temperature of 150° C.

A lithium layer (not shown) is then deposited on the layer 35. After the lithium has diffused, the layer 35 is made of LiTiOS.

A cathode current collector layer 36 is then deposited on the layer 35. It is made in particular out of titanium.

The resulting TiOS layer then presents porosity that increases from the interface between the TiOS layer 35 and the LiPON layer 34 to the interface between the TiOS layer 35 and the cathode current collector layer 36 made of titanium that is deposited on the TiOS layer.

Once more, the method of the invention makes it possible to optimize both the cyclability of the resulting battery and its capacity.

Reference signs that appear in the claims have the sole purpose of making the claims easier to understand and they do not limit the scope thereof in any way.

The invention claimed is:

1. A thin layer lithium-ion type battery comprising, on a substrate (20, 30), a cathode current collector layer (22, 36) and an active portion constituted by a stack of a cathode layer (23, 35) made of material suitable for inserting lithium ions, a solid electrolyte layer (24, 34), and an anode layer (25, 33), wherein the cathode layer presents, across its thickness, porosity that varies between its interface with the cathode current collector layer and its interface with the electrolyte layer, the variation in the porosity being non-zero so as to improve cohesion at both interfaces, wherein the porosity of the cathode layer (23, 35) is greater at an interface between the cathode layer (23, 35) and the cathode current collector layer (22, 36) than at an interface between the cathode layer (23, 35) and the electrolyte layer (24, 34).

2. A battery according to claim 1, wherein the porosity of the cathode layer lies in the range 0 to 70%.

3. A battery according to claim 1, wherein the variation in the porosity is discontinuous.

4. A battery according to claim 1, wherein the variation in the porosity is continuous.

5. A battery according to claim 1, wherein the cathode current collector layer (22, 36) is made of titanium, the cathode layer (23, 35) is made of TiOS associated with lithium ions, and the electrolyte layer (24, 34) is made of LiPON.

6. A method of making a thin layer lithium-ion type battery comprising, on a substrate (20, 30), a cathode current collector layer (22, 36) and an active portion constituted by a stack of a cathode layer (23, 35) made of material suitable for inserting lithium ions, a solid electrolyte layer (24, 34), and an anode layer (25, 33), wherein the cathode layer (23, 35) is obtained by depositing a material on the cathode current collector layer (22) or on the electrolyte layer (34), at least one parameter of the deposition technique used being modified between the beginning and the end of deposition operations so that the cathode layer presents, across its thickness, porosity that varies between its interface with the cathode current collector layer and its interface with the electrolyte layer, the variation in the porosity being non-zero, wherein the porosity of the cathode layer (23, 35) is greater at an interface between the cathode layer (23, 35) and the cathode current collector layer (22, 36) than at an interface between the cathode layer (23, 35) and the electrolyte layer (24, 34).

7. A method according to claim 6, wherein the technique used is a physical vapor deposition technique, said at least one parameter being selected from the temperature of the substrate and the deposition rate.

8. A method according to claim 6, wherein said at least one parameter is modified at least once during the deposition operations.

9. A method according to claim 6, wherein said at least one parameter is modified continuously during the deposition operations.

10. A battery according to claim 2, wherein the porosity of the cathode layer lies in the range 0 to 50%.

* * * * *